| United States Patent [19] | [11] | 4,438,079 |
|---|---|---|
| Nakano et al. | [45] | Mar. 20, 1984 |

[54] METHOD FOR MANUFACTURE OF ARSENIOUS ANHYDRIDE

[75] Inventors: Tadashi Nakano; Hiroyuki Tamura; Naoki Kubo, all of Niihama, Japan

[73] Assignee: Sumitomo Metal Mining Company Limited, Tokyo, Japan

[21] Appl. No.: 362,154

[22] Filed: Mar. 26, 1982

[30] Foreign Application Priority Data

Mar. 30, 1981 [JP] Japan ................... 56-454443
Sep. 11, 1981 [JP] Japan ................... 56-142485

[51] Int. Cl.$^3$ ................... C01B 27/00; C01B 29/00
[52] U.S. Cl. ................... 423/87; 423/617
[58] Field of Search ................... 423/87, 617

[56] References Cited

U.S. PATENT DOCUMENTS

| 1,921,706 | 8/1933 | Schopper | 423/87 |
| 1,952,290 | 3/1934 | Schopper | 423/87 |
| 4,096,232 | 6/1978 | Vogt | 423/87 |
| 4,102,976 | 7/1978 | Hiemeleers et al. | 423/87 |
| 4,218,425 | 8/1980 | Charlton et al. | 423/87 |

FOREIGN PATENT DOCUMENTS

| 52-54699 | 5/1977 | Japan | 423/87 |

*Primary Examiner*—Edward J. Meros
*Assistant Examiner*—Wayne A. Langel
*Attorney, Agent, or Firm*—Watson, Cole, Grindle & Watson

[57] ABSTRACT

Arsenic anhydride of high purity is inexpensively manufactured from an arsenic sulfide-containing substance by first contacting the arsenic sulfide-containing substance with a copper sulfate-containing aqueous solution so as to provide an extract solution containing arsenious acid, the extract solution is subjected to aeration in the presence of copper ions such that the arsenious acid therein is mostly oxidized to arsenic acid, the thus provided treated solution is subjected to a weak reducing agent to cause crystals of arsenious anhydride to form, and these crystals are then recovered. Alternatively, the extract solution is cooled to recover a solid precipitate containing arsenious anhydride, these solids are repulped into a slurry, the slurry subjected to aeration in the presence of copper ions such that the arsenious acid therein is mostly oxidized to arsenic acid, the thus provided treated solution is subjected to a weak reducing agent to cause crystals of arsenious anhydride to form, and these crystals are then recovered.

26 Claims, 2 Drawing Figures

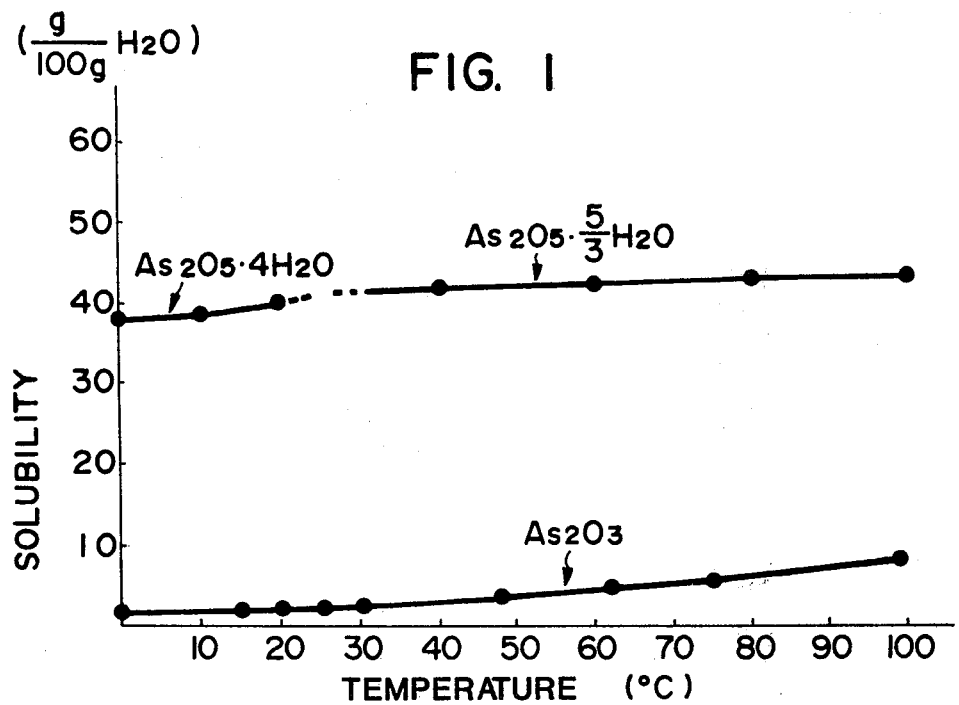
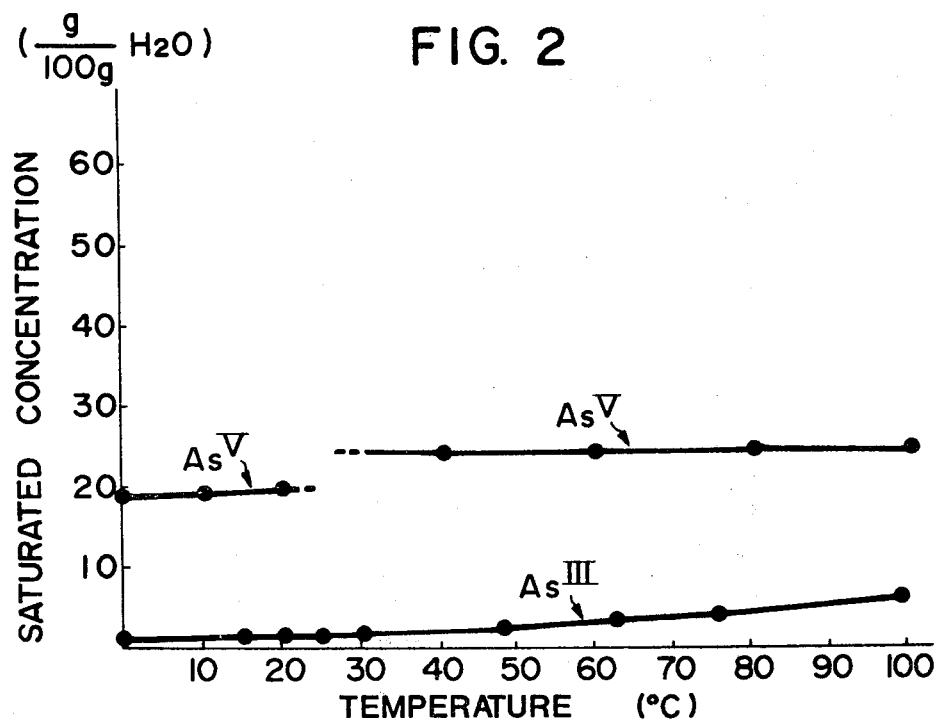

METHOD FOR MANUFACTURE OF ARSENIOUS ANHYDRIDE

BACKGROUND OF THE INVENTION

1. Field of the Invention

This invention relates to a method for the manufacture of arsenious anhydride ($As_2O_3$) from a substance containing arsenic sulfide.

2. Description of the Prior Art

Arsenic (As) which is contained in waste water is prevalently removed therefrom by being precipitated in the form of arsenic sulfide containing substance also ($As_2S_3$). The recovered arsenic sulfide generally contains impurities.

A method generally followed in producing arsenious anhydride from such an arsenic sulfide-containing substance comprises extracting arsenic from the arsenic sulfide-containing substance into a copper sulfate-containing aqueous solution at an elevated temperature by use of an autoclave, thereby obtaining a solution containing arsenious acid in nearly a saturated concentration, and subsequently cooling the produced solution, thereby crystallizing the arsenious anhydride therein, and recovering the crystallized arsenious anhydride.

This method has the disadvantage that the procedure involved is dangerous because copper sulfide and solid impurities must be separated from the produced solution at an elevated temperature and the raw material requires careful selection or the produced arsenious anhydride will require repurification because impurities may possibly be crystallized simultaneously with the arsenious anhydride owing to the cooling method employed for the crystallization.

This disadvantage may be precluded by a method which comprises obtaining a solution containing arsenious acid in a low concentration, cooling this solution, removing copper sulfide and solid impurities, subsequently concentrating the remaining solution, by evaporation, and cooling the solution thereby crystallizing arsenious anhydride therein (as disclosed in JA-OS No. 54699/1977 laid open for public inspection in May 4, 1977, for example). However, this method has the disadvantage that the volumes of solutions to be treated are increased and the concentration of such solutions requires a large amount of thermal energy.

SUMMARY OF THE INVENTION

An object of this invention is to provide a method which overcomes the disadvantage described above and permits arsenious anhydride of high purity to be produced at a low cost.

The inventors made a diligent study with a view to attaining the object described above. They consequently found that when a solution or solid containing arsenious acid is subjected to aeration in the presence of copper ions, the elemental of arsenic is oxidized from its trivalent form into a pentavalent form. On the basis of this discovery, they have perfected a method for the manufacture of arsenious anhydride, which comprises extracting arsenic from an arsenic sulfide-containing substance into an aqueous solution containing copper sulfate, oxidizing the greater part of the arsenious acid present in the extract into arsenic acid, filtering the extraction residue containing copper sulfide and solid impurities, and subsequently weakly reducing the filtrate, thereby crystallizing arsenious anhydride therein for subsequent recovery.

BRIEF DESCRIPTION OF THE DRAWING

FIG. 1 is a graph showing the solubilities of $As_2O_3$, $As_2O_5.4H_2O$ and $As_2O_5.5/3H_2O$.

FIG. 2 is a graph showing the saturated concentrations of $As^{III}$ and $As^V$ calculated from the values of solubilities of FIG. 1.

DETAILED DESCRIPTION OF THE INVENTION

By the first method of this invention, arsenious anhydride is manufactured by causing the aeration performed for the extraction of arsenic from the arsenic sulfide-containing substance into the aqueous solution containing copper sulfate to be carried out in the presence of at least 1 g of copper ions per liter, thereby simultaneously effecting the extraction of arsenic and oxidation of the greater part of the arsenious acid in the extract into arsenic acid, filtrating the extraction residue, applying a weak reducing agent to the resultant filtrate, thereby reducing arsenic acid in the solution into arsenious acid and crystallizing arsenious anhydride therein for subsequent recovery.

When a powdered arsenic sulfide-containing substance is repulped in the form of slurry in an aqueous solution containing copper sulfate and the resultant mixture is stirred and heated to a temperature of at least 50° C., preferably to the level of 90° C., the arsenic is extracted as indicated by the following formula.

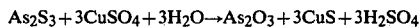

$$As_2S_3 + 3CuSO_4 + 3H_2O \rightarrow As_2O_3 + 3CuS + 3H_2SO_4$$

Since the solubility of $As_2O_3$ is not very high, $As_2O_3$ is crystallized in the slurry when the amount of arsenic to be extracted is large. This crystallization of $As_2O_3$, however, offers no appreciable hindrance to the reaction of extraction.

By the second method of this invention, arsenious anhydride is manufactured by extracting arsenic from the arsenic sulfide-containing substance into an aqueous solution containing copper sulfate, cooling the extract containing the extraction residue, thereby recovering solids containing arsenious anhydride, repulping the recovered solids, subjecting the resultant slurry to aeration in the presence of at least 1 g of copper ions per liter, thereby oxidizing the greater part of the arsenious acid into arsenic acid, filtering the residue, and subsequently adding a weak reducing agent to the filtrate, thereby crystallizing the arsenious anhydride therein, and recovering the anhydride.

After the reaction of extraction involved in the second method described above, the slurry is cooled to a level near room temperature to effect solid-liquid separation and recover solids containing arsenious anhydride, copper sulfide precipitate and solid impurities, and the resultant fitrate is subjected to a waste water treatment. This process is required for the following reason. As indicated by the reaction formula shown above, free sulfuric acid accumulates in the reaction system with the progress of the extraction of arsenic. When the concentration of the free sulfuric acid exceeds a particular level (about 70 g/lit.), the accumulated free sulfuric acid begins to hold down the oxidation of arsenious acid and proves to be a great hindrance to the production of an arsenic acid solution of high concentration. By the performance of this process, free sulfuric acid is expelled out of the reaction system. Since the solution thus expelled has a small amount of arsenious acid dissolved therein, it is subjected first to a treatment for the removal of arsenic and then to a treatment for neutralization. The arsenic-containing substance which is recovered here may be used as the raw material for the operation of this invention.

The solids which are recovered in the course of the process described above are repulped in an aqueous solution containing copper sulfate and converted into a slurry. This slurry is heated to a temperature of at least 20° C., preferably to a level of about 80° C., and aerated as by means of turbo agitation. Consequently, arsenious acid contained therein is oxidized into arsenic acid.

In this method, the extract is cooled to room temperature to effect solid-liquid separation. Optionally, this separation may be carried out by the process of flotation instead. To be specific, the separation may be effected by a procedure which comprises diluting the slurry obtained after the extraction to a concentration suitable for flotation (below 300 g/liter), preferably to a concentration of 100 to 200 g/liter, by addition of a small amount of water or an aqueous solution containing arsenic (desirably an aqueous solution saturated with arsenic), causing arsenious acid to float to the surface of the slurry by blowing air into the diluted slurry or subjecting the slurry to flotation, and separating the floating crude arsenious anhydride for recovery.

During this flotation process, reagents such as pine oil and methylisobutyl carbinol (M.I.B.C.) which are generally used in the flotation process may be used in ordinary amounts (on the range of 1 g to 100 g per ton of the substance under treatment).

In either of the two methods described above, copper ions and copper sulfide are believed to function as a catalyst. The copper ions sufficiently fulfill the purpose when they are present in concentration of at least 1 g/liter. If the copper ions are present in an excess, they go to adhere to arsenious anhydride and degrade the purity. For practical purpose, therefore, they are desired to be present in a concentration of 5 to 40 g/liter, preferably around 30 g/liter.

The reaction of oxidation of arsenious acid to arsenic acid proceeds rather slowly. By suitably selecting the reaction time, the ratio of arsenious acid to arsenic acid can be freely controlled. Normally, the greater part of the arsenic is converted into arsenic acid. If the solution contains impurities which are readily coprecipitable with arsenious anhydride, it is allowed to retain therein arsenious acid in a concentration slightly exceeding the solubility thereof. When this solution is cooled, the impurities can be removed simultaneously with the small amount of arsenious anhydride. In this manner, the purity of the arsenious anhydride to be finally obtained can be heightened.

The conversion of the greater part of arsenic present in the solution to arsenic acid brings about the following advantages. The first advantage is that the conversion gives a solution containing arsenic in a higher concentration because the solubility of arsenic acid is greater than that of arsenious acid. It is only natural that the efficiency of the crystallization of arsenious anhydride heightens in proportion as the concentration of arsenic increases. Consequently, the equipment to be used for the extraction and crystallization can be decreased in size and the cost of equipment can be lowered.

The second advantage is that the necessity for keeping the temperature at constant level during the step of filtration is obviated because arsenic acid or arsenious acid is not crystallized by mere cooling when the greater part of arsenic is converted in the form of unsaturated arsenic acid. Optionally, the dissolved impurities in the solution may be crystallized and removed by cooling.

FIG. 1 shows the solubilities of arsenious anhydride ($As_2O_3$) and arsenic acids ($As_2O_5.4H_2O$ and $As_2O_5.5/3-H_2O$). FIG. 2 shows the saturated concentrations of trivalent arsenic ($As^{III}$) and pentavalent arsenic ($As^V$) calculated from the numerical values of solubility of FIG. 1. The description given above will be understood easily from these graphs.

The aqueous solution containing copper sulfate which is used in this invention may contain a small amount of impurities. For example, the leached liquor of precipitated copper or the electrolytic decopperized slime with sulfuric acid, or the mother liquor remaining after the recovery of arsenious anhydride in the final step of the method of this invention may be used.

When the slurry obtained by the aforementioned step of oxidation is subjected to solid-liquid separation, there is obtained a solution containing arsenic in the form of arsenic acid. When a weak reducing agent is applied to this solution, the arsenic acid is reduced to arsenious acid and the portion of arsenious acid exceeding the amount of solubility is crystallized in the form of arsenious anhydride. As the reducing agent, sulfur dioxide is advantageously used.

The process of extraction described above proceeds at a low speed at a low temperature. The extraction, therefore, is desired to be carried out at a temperature in the range of 50° to 100° C.

The extraction residue which contains copper sulfide can be used as the raw material for the copper smelting.

As described above, all the steps of the method of this invention can be performed under normal atmospheric pressure at temperatures not exceeding 100° C. And a solution having a high arsenic concentration can be obtained without being concentrated by evaporation. The method of this invention, therefore, is highly advantageous from the standpoint of cost. Further, the method of this invention has the advantage that it can produce arsenious anhydride having a lower content of impurities than the method of crystallization by cooling because the crystallization of arsenious anhydride in the final step can be carried out at a relatively high temperature.

Now, examples of this invention and a comparative experiment will be described.

EXAMPLE 1

In an aqueous solution obtained by dissolving 800 g of crystalline copper sulfate in 2 liters of water, 1.5 kg of an arsenic sulfide-containing substance (having a water content of 80%) was stirred at 80° C. for five hours to effect extraction and oxidation of arsenic. Then, the mixture was cooled to 60° C. About 600 g of extraction residue was filtered off.

Three (3) liters of the extract thus obtained was cooled to room temperature. By blowing sulfur dioxide into the cooled extract, the arsenic acid was reduced. Consequently, there was obtained 92 g of arsenic anhydride.

The composition of the arsenic sulfide-containing substance, that of the copper sulfate solution, that of the extraction residue, that of the extract, and that of arsenious anhydride are shown in Table 1. The purity of the produced arsenious anhydride was 99.6% by weight.

EXAMPLE 2

Two hundred (200) g of electrolytic decopperized slime (on wet basis) was heated with dilute sulfuric acid, aerated, and extracted. In 2 liters of the resultant aqueous copper sulfate solution, 400 g of crystalline copper sulfate was dissolved. The resultant solution was mixed with 1.5 kg of the same arsenic sulfide-containing substance as used in Example 1 (having a water content of 80%). By following the procedure of Example 1, the resultant mixture was subjected to extraction, the extraction residue was separated by filtration, and the filtrate was subjected to a reducing treatment. Consequently, there was obtained about 600 g of extraction residue and 170 g of arsenious anhydride.

The composition of the arsenic sulfide-containing substance, that of the copper sulfate-containing solution, that of the extraction residue, that of the extract, and that of arsenious anhydride are shown in Table 2. The purity of the produced arsenious anhydride was 99.3% by weight.

EXAMPLE 3

Four hundred (400) g of electrolytic decopperized slime (on wet basis) was heated with dilute sulfuric acid, aerated, and extracted. In 2 liters of the resultant aqueous copper sulfate solution, 1.5 kg of the same arsenic sulfide-containing substance as used in Example 1 (having a water content of 80%) was mixed, the resultant mixture was stirred and heated at 80° C. for three hours to effect extraction and oxidation of arsenic. The mixture was cooled to 60° C. and, thereafter, about 600 g of extraction residue was separated by filtration.

When the extract thus obtained was cooled to room temperature, part of the arsenious acid was crystallized as arsenious anhydride.

The crystallized arsenious anhydride was separated by filtration. When sulfur dioxide was blown into the filtrate, the arsenic acid was reduced. Consequently, 270 g of arsenious anhydride was crystallized and recovered.

The composition of the arsenic sulfide-containing substance, that of the copper sulfate-containing solution, that of the extraction residue, that of the extract, that of the extract obtained after cooling and separation by filtration, and that of the finally obtained arsenious anhydride are shown in Table 3. The purity of the produced arsenious anhydride was 99.6% by weight.

The main impurity in the arsenious anhydride obtained in Example 2 was antimony. In Example 3, since arsenious acid was allowed to remain in an amount slightly exceeding the solubility in the steps of extraction and oxidation of arsenic, a small amount of arsenious anhydride was crystallized when the reaction system was cooled to room temperature. Since antimony was coprecipitated with this arsenious anhydride, the antimony concentration in the extract could be lowered proportionally. As the result, the antimony content in the finally obtained arsenious anhydride was lowered to about one fifth of the level in the arsenious anhydride of Example 2. Thus, the purity of the produced arsenious anhydride could be heightened.

TABLE 1

| | Arsenic sulfide-containing substance 1.5 Kg | | Copper sulfate containing Solution 2 l | | Extraction residue 600 g | | Extract 3 l | | Extract after cooling and separation by filtration | | Arsenious anhydride 92 g |
|---|---|---|---|---|---|---|---|---|---|---|---|
| | (% by weight) | (g) | (g/l) | (g) | (% by weight) | (g) | (g/l) | (g) | (g/l) | (g) | (% by weight) |
| Cu | 0.05 | 0.15 | 102.4 | 204.8 | 61.7 | 185.1 | 5.0 | 15.0 | — | — | 0.0002 |
| As$^{III}$ | — | — | — | — | — | — | 2.5 | 7.5 | — | — | As$_2$O$_3$ 99.6 |
| | 40.0 | 120 | | | 2.5 | 7.5 | | | | | |
| As$^V$ | — | — | — | — | — | — | 35.0 | 105.0 | — | — | |
| Sb | 0.08 | 0.24 | — | — | 0.01 | 0.03 | 0.05 | 0.15 | — | — | 0.22 |
| Bi | <0.01 | — | — | — | — | — | — | — | — | — | — |
| Fe | 0.34 | 1.02 | — | — | — | — | 0.34 | 1.02 | — | — | 0.0002 |
| Zn | 6.00 | 18.00 | — | — | — | — | 6.00 | 18.00 | — | — | 0.0003 |
| H$_2$O | 80 | / | — | / | 50 | / | — | / | — | / | 5.0 |

TABLE 2

| | Arsenic sulfide-containing substance 1.5 Kg | | Copper sulfate containing solution 2 l | | Extraction residue 600 g | | Extract 3 l | | Extract after cooling and separation by filtration | | Arsenious anhydride 170 g |
|---|---|---|---|---|---|---|---|---|---|---|---|
| | (% by weight) | (g) | (g/l) | (g) | (% by weight) | (g) | (g/l) | (g) | (g/l) | (g) | (% by weight) |
| Cu | 0.05 | 0.15 | 102.2 | 204.4 | 62.3 | 186.9 | 5.0 | 15.0 | — | — | 0.0003 |
| As$^{III}$ | — | — | — | — | — | — | 2.9 | 8.7 | — | — | As$_2$O$_3$ 99.3 |
| | 40.0 | 120 | 35.6 | 71.2 | 3.5 | 10.5 | | | | | |
| As$^V$ | — | — | — | — | — | — | 55.0 | 165.0 | — | — | |
| Sb | 0.08 | 0.24 | 0.85 | 1.7 | 0.20 | 0.6 | 0.40 | 1.20 | — | — | 0.48 |
| Bi | <0.01 | — | 0.057 | 0.114 | 0.04 | 0.12 | — | — | — | — | — |
| Fe | 0.34 | 1.02 | 0.043 | 0.086 | — | — | 0.39 | 1.17 | — | — | 0.0002 |
| Zn | 6.00 | 18.00 | 0.028 | 0.056 | — | — | 6.0 | 18.0 | — | — | 0.0002 |
| H$_2$O | 80 | / | — | / | 50 | / | — | / | — | / | 7.5 |

TABLE 3

| | Arsenic sulfide-containing substance 1.5 Kg | | Copper sulfate containing solution 2 l | | Extract residue 600 g | | Extract 3 l | | Extract after cooling and separation by filtration | | Arsenious anhydride 270 g |
|---|---|---|---|---|---|---|---|---|---|---|---|
| | (% by weight) | (g) | (g/l) | (g) | (% by weight) | (g) | (g/l) | (g) | (g/l) | (g) | (% by weight) |
| Cu | 0.05 | 0.15 | 102 | 204 | 63.0 | 189.0 | 5.0 | 15.0 | 5.0 | 15.0 | 0.0005 |
| $As^{III}$ | 40.0 | 120 | 71.2 | 142.4 | 4.0 | 12.0 | 18.5 | 55.5 | 15.0 | 45.0 | $As_2O_3$ 99.6 |
| $As^V$ | | | | | | | 65.0 | 195.0 | 65.0 | 195.0 | |
| Sb | 0.08 | 0.24 | 1.70 | 3.4 | 0.4 | 1.2 | 0.81 | 2.43 | 0.08 | 0.24 | 0.1 |
| Bi | <0.01 | — | 0.114 | 0.228 | 0.08 | 0.24 | — | — | — | — | — |
| Fe | 0.34 | 1.02 | 0.086 | 0.172 | — | — | 0.40 | 1.20 | 0.40 | 1.20 | 0.0002 |
| Zn | 6.00 | 18.00 | 0.056 | 0.112 | — | — | 6.04 | 18.12 | 6.04 | 18.12 | 0.0003 |
| $H_2O$ | 80 | / | — | / | 50 | / | — | / | — | / | 5.0 |

EXAMPLE 4

With 400 liters of a solution containing 15.5 g of $As^{III}$, 13.2 g of $As^V$, 32.6 g of Cu, 0.14 g of Sb, 0.52 g of Ca, and 89.5 g of free sulfuric acid respectively per liter and 100 liters of water, 700 kg of an arsenic sulfide precipitate [39.7% of As, 0.12% of Sb, 0.18% of Fe, 4.03% of Zn, 4.17% of Ca, and 78.2% of water respectively by weight (on dry basis)] was converted into slurry. This slurry was mixed with 360 kg of crystalline copper sulfate. The resultant mixture was heated to 85° C. and stirred for two hours to effect extraction. The stirred hot slurry was cooled to room temperature to effect solid-liquid separation. Consequently, there were obtained 567 kg of solids (wet weight) and 100 liters of solution. This solution was analyzed. The analyses are shown in Table 4.

TABLE 4

| | Total As | Cu | Sb | Ca | Free sulfuric acid |
|---|---|---|---|---|---|
| Content (g/liter) | 13.4 | 11.2 | 0.008 | 0.60 | 107 |

With 400 liters of a solution containing 12.5 g of $As^{III}$, 5.09 g of $As^V$, 34.0 g of Cu, 0.16 g of Sb, 0.53 g of Ca, and 91.1 g of free sulfuric acid respectively per liter and 630 liters of a solution containing 4.3 g of $As^{III}$, 17.1 g of $As^V$, 12.0 g of Cu, 0.054 g of Sb, 0.54 g of Ca, and 29.8 g of free sulfuric acid respectively per liter, 567 kg of said solids were converted into slurry. This slurry was mixed with 110 kg of crystalline copper sulfate. The resultant mixture was heated to 80° C. and aerated by turbo agitation for 7.5 hours. The slurry was then cooled to room temperature to effect solid-liquid separation. Consequently, there were obtained 438 kg of residue (wet weight) and 982 liters of an arsenic acid-containing solution.

The residue and the arsenic acid-containing solution were analyzed. The analyses are shown in Table 5 and Table 6.

TABLE 5

| | Residue | | | | | |
|---|---|---|---|---|---|---|
| | As | Cu | Sb | Ca | Zn | $H_2O$ |
| Content (% by weight on dry basis) | 3.73 | 48.4 | 0.07 | 2.70 | 0.10 | 60.8 |

TABLE 6

| | Arsenic acid-containing solution | | | | | |
|---|---|---|---|---|---|---|
| | $As^{III}$ | $As^V$ | Cu | Sb | Ca | Free sulfuric acid |
| Content (g/liter) | 12.4 | 58.8 | 41.0 | 0.23 | 0.51 | 82.9 |

By blowing sulfur dioxide into the produced arsenic acid-containing solution thereby reducing the arsenic acid, arsenious anhydride was crystallized. Consequently, 67.7 kg of arsenious anhydride was recovered. The analysis of the produced arsenious anhydride are shown in Table 7.

TABLE 7

| | $As_2O_3$ | Cu | Sb | Bi | Fe | Si | Pb | Ca | Zn | $H_2O$ |
|---|---|---|---|---|---|---|---|---|---|---|
| Content (% by weight) | 99.9 | 0.0011 | 0.064 | 0.0002 | <0.0001 | <0.001 | <0.0001 | <0.0001 | <0.0001 | <0.1 |

It is apparent from the comparison of the composition of Table 6 with that of undermentioned Table 8 that the reaction of $As^{III} \rightarrow As^V$ proceeded at a higher velocity. It will be readily noted that this high reaction velocity was ascribable to the concentration of free sulfuric acid.

COMPARATIVE EXPERIMENT

With 700 liter of water, 390 kg of arsenic sulfide precipitate [39.7% of As, 0.12% of Sb, 0.18% of Fe, 4.03% of Zn, 4.17% of Ca, 78.2% of water respectively by weight (on dry basis)] was converted into slurry. This slurry was mixed with 420 kg of crystalline copper sulfate and the resultant mixture was heated at 80° C. and aerated by turbo agitation for 11 hours and subsequently subjected to solid-liquid separation at 60° C. The resultant solution (800 liters) was analyzed. The analyses are shown in Table 8.

TABLE 8

| | $As^{III}$ | $As^V$ | Cu | Ca | Free sulfuric acid |
|---|---|---|---|---|---|
| Content (g/liter) | 26.0 | 34.8 | 35.6 | 0.97 | 136 |

It is noted from Table 8 that the oxidation of $As^{III}$ to $As^V$ occurred insufficiently.

What is claimed is:

1. A method of manufacturing arsenious anhydride from an arsenic sulfide-containing substance, said method comprising the steps of
   (a) extracting arsenic from the arsenic sulfide-containing substance by contacting the arsenic sulfide-containing substance with a copper sulfate-containing aqueous solution to thereby produce an extract solution containing arsenious acid together with an extraction residue,
   (b) oxidizing the extract solution obtained in step (a) in the presence of at least 1 g/l of copper ions to convert most of the arsenious acid therein to arsenic acid and thereby provide an oxidized solution,
   (c) contacting the oxidized solution obtained in step (b) with a weak reducing agent to form crystals of arsenious anhydride, and
   (d) recovering said crystals of arsenious anhydride formed in step (c).

2. The method according to claim 1 wherein said copper sulfate-containing aqueous solution used in step (a) contains sufficient copper ions that the extract solution contains at least 1 g/l of copper ions, and wherein extracting step (a) and oxidizing step (b) are caused to occur simultaneously by aerating the copper sulfate-containing aqueous solution as the arsenic sulfide-containing substance is added thereto, such that most of the formed arsenious acid is oxidized to arsenic acid.

3. The method according to claim 2 wherein said copper sulfate-containing aqueous solution used in extracting step (a) contains sufficient copper ions that the extract solution contains between 5 and 40 g/l of copper ions.

4. The method according to claim 2 wherein extracting step (a) is conducted at a temperature of between 50° and 100° C.

5. The method according to claim 1 wherein said copper sulfate-containing aqueous solution used in extracting step (a) comprises a leached liquor of precipitated copper.

6. The method according to claim 1, wherein said copper sulfate-containing aqueous solution used in extracting step (a) comprises an aqueous solution of electrolytic decopperized slime and sulfuric acid.

7. The method according to claim 1 wherein in contacting step (c) sulfur dioxide is blown into said treated solution.

8. The method according to claim 1 wherein oxidizing step (b) includes the steps of (i) oxidizing the extract solution obtained in step (a) to provide an intermediate solution containing arsenious acid and arsenic acid, (ii) separating said extraction residue from the intermediate solution by filtration, (iii) cooling the intermediate solution to room temperature so as to form crystals of arsenious anhydride, and (iv) removing said crystals of arsenious anhydride from the intermediate solution to thereby provide the oxidizing solution.

9. The method according to claim 1 wherein oxidizing step (b) includes the steps of (i) cooling the extract solution to room temperature so as to form crystals of arsenious anhydride, (ii) removing said crystals of arsenious anhydride and said extraction residue from the extract solution by filtration, and (iii) oxidizing the extract solution to provide the oxidizing solution.

10. The method according to claim 1 wherein oxidizing step (b) includes the steps (i) cooling the extract solution obtained in step (a) to form solids containing crystals of arsenious anhydride, (ii) recovering said solids, (iii) repulping said solids to form a slurry, and (iv) aerating said slurry in the presence of at least 1 g/l of copper ions to thereby provide the oxidized solution.

11. The method according to claim 10 wherein extracting step (a) is conducted at a temperature of about 50° C.

12. The method according to claim 11 wherein extracting step (a) is conducted at a temperature of at least 90° C.

13. The method according to claim 10 wherein aerating step (iv) is conducted at a temperature of at least 20° C.

14. The method according to claim 13 wherein aerating step (iv) is conducted at a temperature of about 80° C.

15. The method according to claim 10 wherein in aerating step (iv) the copper ions are present in an amount from 5 to 40 g/l.

16. The method according to claim 10 wherein said copper sulfate-containing aqueous solution in extracting step (a) comprises a leached liquor of precipitated copper.

17. The method according to claim 10 wherein said copper sulfate-containing aqueous solution in extracting step (a) comprises an aqueous solution containing electrolytic decopperized slime and sulfuric acid.

18. The method according to claim 10 wherein in contacting step (c) sulfur dioxide is blown into said treated solution.

19. The method according to claim 10 wherein cooling step (i) comprises cooling the extract solution to near room temperature.

20. The method according to claim 10 wherein recovering step (ii) comprises the steps of adding a small amount of water to said extract solution to provide a diluted extract solution and then subjecting the diluted extract solution to a flotation treatment such that said solids float to the surface of the diluted extract solution.

21. The method according to claim 20 wherein said water is added to said extract solution until the concentration of arsenious acid therein is reduced to 300 g/l.

22. The method according to claim 10 wherein recovering step (ii) comprises the steps of adding small amounts of an arsenic-containing aqueous solution to said extract solution to provide a diluted extract solution, and then subjecting the diluted extract solution to a flotation treatment such that said solids float to the surface of said dilute extract solution.

23. The method according to claim 22 wherein said arsenic-containing aqueous solution is added to said extract solution until the concentration of arsenious acid therein is reduced to 300 g/l.

24. A method of manufacturing arsenious anhydride from an arsenic sulfide-containing substance, said method comprising the steps of
   (a) extracting arsenic from the arsenic sulfide-containing substance by contacting the arsenic sulfide-containing substance with a copper sulfate-containing aqueous solution which contains sufficient copper ions that the formed extract solution contains at least 1 g/l of copper ions and simultaneously aerating at atmospheric pressure said extract solution such that the arsenious acid initially formed therein is mostly oxidized to arsenic acid, an extraction residue being also formed, (b) separating said extraction residue from said extract solution formed in step (a) by filtration, thereby providing a filtrate, (c) contacting said filtrate from step (b) with a weak reducing agent to form crystals of arsenious anhydride therein, and (d) recovering said crystals of arsenious anhydride formed in step (c).

25. A method of manufacturing arsenious anhydride from an arsenic sulfide-containing substance, said method comprising the steps of (a) extracting arsenic from the arsenic sulfide-containing substance by contacting the arsenic sulfide-containing aqueous solution which contains sufficient copper ions that the formed extract solution contains at least 1 g/l of copper ions and simultaneously aerating at atmospheric pressure said extract solution such that the arsenious acid initially formed therein is mostly oxidized to arsenic acid, residue also being formed, (b) separating said extraction residue from said extract solution formed in step (a) by filtration, thereby providing a filtrate, (c) cooling said filtrate from step (b) to form a cooled filtrate containing crystals of arsenious anhydride, (d) recovering said crystals of arsenious anhydride from said cooled filtrate in step (c) by filtration, leaving a filtrate containing arsenic acid, (e) contacting the filtrate containing arsenic acid in step (d) with a weak reducing agent to form crystals of arsenious anhydride, and (f) recovering said crystals of arsenious anhydride formed in step (e).

26. A method of manufacturing arsenious anhydride from an arsenic sulfide-containing substance, said method comprising the steps of (a) extracting arsenic from the arsenic sulfide-containing substance with a copper sulfate-containing aqueous solution to provide an extract solution containing arsenious acid and an extraction residue, (b) cooling the extract solution and extraction residue of step (a) to produce a solid precipitate containing arsenious anhydride, (c) recovering said precipitate formed in step (b), (d) repulping said precipitate obtained in step (c) to form a slurry, (e) aerating at atmospheric pressure said slurry formed in step (d) in the presence of at least 1 g/l of copper ions to oxidize most of the arsenious acid in the slurry to arsenic acid and formed a solid residue, (f) removing said solid residue from the slurry in step (e) by filtration, thereby providing a filtrate, (g) contacting the filtrate of step (f) with a weak reducing agent to form crystals of arsenious anhydride, and (h) recovering said crystals of arsenious anhydride formed in step (g).

* * * * *